United States Patent

Hoppstock et al.

[15] 3,676,518

[45] July 11, 1972

[54] PREPARATION OF DIOLEFINS FROM TERTIARY AND SECONDARY ALKYL HALIDES CONTAINING ONLY FOUR CARBON ATOMS IN THE MAIN CHAIN

[72] Inventors: Frederic H. Hoppstock; Louis A. Falvo, both of Akron; Kenneth J. Frech, Tallmadge, all of Ohio

[73] Assignee: The Goodyear Tire & Rubber Company, Akron, Ohio

[22] Filed: Oct. 17, 1969

[21] Appl. No.: 867,395

[52] U.S. Cl.................260/680 R, 260/677 XA, 260/680 XA
[51] Int. Cl................................................C07c 1/30
[58] Field of Search..................260/680 XA, 677 XA, 680 D

[56] References Cited

UNITED STATES PATENTS 2,288,580   6/1942   Baehr et al............................260/680
3,404,193   10/1968   Bajars.....................................260/680

*Primary Examiner*—Paul M. Coughlan, Jr.
*Attorney*—F. W. Brunner and J. Y. Clowney

[57] ABSTRACT

There is disclosed a method for the preparation of certain diolefins such as 1,3-butadiene, isoprene and 2,3-dimethyl-1,3-butadiene which comprises simultaneously dehydrohalogenating and dehydrogenating alkyl halides such as 2-halo-butanes, 2-methyl-2-halo-butanes, 3-methyl-2-halo-butanes and 2,3-dimethyl-2-halo-butanes. The process requires the use of catalysts which are preferably metal oxides of groups I$b$, II$a$, II$b$, III$a$, IV$a$, IV$b$, V$a$, V$b$, VI$b$, VII$b$, *VIII and the lanthanum and actinium series of the Periodic System. Of these metal oxides it is preferred to employ silica and/or alumina.*

4 Claims, No Drawings

PREPARATION OF DIOLEFINS FROM TERTIARY AND SECONDARY ALKYL HALIDES CONTAINING ONLY FOUR CARBON ATOMS IN THE MAIN CHAIN

This invention is directed to the formation of certain diolefins from certain secondary and tertiary alkyl halides containing no more than four carbon atoms in the main chain of said alkyl halides by the simultaneous dehydrohalogenation and dehydrogenation of these secondary and tertiary alkyl halides.

Certain conjugated diolefins, particularly 1,3-butadiene, isoprene (2-methyl-1,3-butadiene) and 2,3-dimethyl-1,3-butadiene are widely used in the formation of synthetic rubber.

Various methods for the preparation of these diolefins are known. For instance, one well known method is to dehydrogenate the corresponding paraffin and/or olefin to form a diolefin containing the same number of carbon atoms as did the olefin and/or paraffin. As an example, butane or any of the normal butenes can be dehydrogenated to form 1,3-butadiene. Likewise, 2-methyl butane, 2-methyl-2-butene or 2-methyl-1-butene can be dehydrogenated to form isoprene.

Another known method of preparing diolefins is the dealkylation of olefins containing more carbon atoms than does the diolefin desired and which has substituents, if any, in a position corresponding to that of the desired olefins. For example, pentene-2 can be demethanated to form 1,3-butadiene, 2- and/or 3-methyl pentene-2 can be demethanated to form 2-methyl-1,3-butadiene or isoprene. Likewise, 2,3-dimethyl-2-pentene can be demethanated to form 2,3-dimethyl-1,3-butadiene.

These prior art processes, while they are being employed commercially to produce diolefins, have been found to have certain deficiencies or limitations and for this reason are somewhat costly to operate.

When paraffins are dehydrogenated to form diolefins, the reaction efficiencies or selectivities are not too high. For instance, when normal butane is dehydrogenated to form the diolefin, 1,3-butadiene, the efficiencies or selectivities have been found to be no greater than about 55–60 percent at reasonable conversion levels and throughput rates. (The term "efficiency" or "selectivity" as employed in this application is meant to denote the amount of feedstock which is ultimately converted into the desired diolefin employing normal recycle techniques, whether it be a dehydrogenation process, a dealkylation process of the prior art, or, as in the case of this invention, a simultaneous or concerted dehydrogenation and dehydrohalogenation process. The remainder of the feedstock which undergoes a reaction is converted into unwanted byproducts due to side reactions and the like.) In the dehydrogenation process to form diolefins where the starting material is an olefin, for instance, where butenes are dehydrogenated to form butadiene-1,3, while the efficiencies are acceptable, the capital investment is extremely high. This high capital investment is due to the fact that large quantities of a diluent, usually steam, must be put through the dehydrogenation process along with the olefin to reduce the partial pressure of the reactant olefin and to reduce the amount of coking in the catalyst bed. This large quantity of diluent is also required when paraffins are dehydrogenated as well for the same reason. An alternative to the use of large amounts of diluent is to operate at reduced pressure. Further, even though large quantities of a diluent, such as steam, are employed, coking of the catalyst bed becomes a problem because the effectiveness of the catalyst is lowered when the catalyst becomes coked and the catalyst must be regenerated quite often. This fact also leads to a high operating cost as well as a high original capital investment cost for the required large steam plant and multiple dehydrogenation reactors.

In processes which form diolefins by demethanation or dealkylation of olefins, such as the demethanation of 2-methyl-2-pentene to form isoprene, the efficiencies or selectivities have not been found to exceed about 55 to 60 percent. This means that such processes employing dealkylation can be improved on because significant amounts of starting material or feedstock is converted into unwanted byproducts.

It is, therefore, the object of this invention to provide a process for the manufacture of certain diolefins wherein certain secondary and tertiary alkyl halides are converted into diolefins at high efficiencies or selectivities. It is, also, the object of this invention to provide a process for the manufacture of diolefins from certain secondary and tertiary alkyl halides in which the capital cost is somewhat lower than those of the known prior art processes now in commercial use.

According to the invention, these and other objects are accomplished by the simultaneous dehydrohalogenation and dehydrogenation of at least one alkyl halide selected from the group of 2-halo-butanes, 2-methyl-2-halo-butanes, 3-methyl-2-halo-butanes and 2,3-dimethyl-2-halo-butanes.

It should be noted that the alkyl halides employed in the practice of this invention contain only four carbon atoms in the main chain.

Representative of the alkyl halides which contain four carbon atoms in the main chain which can be dehydrohalogenated and dehydrogenated simultaneously to form butadiene-1,3 are 2-halo-butanes, such as 2-chloro-butane, 2-bromo-butane and 2-iodo-butane.

Representative of the alkyl halides containing four carbon atoms in the main chain which can be dehydrohalogenated and dehydrogenated simultaneously to form isoprene are 2-methyl-2-halo-butanes, such as 2-methyl-2-chloro-butane; 2-methyl-2-bromo-butane and 2-methyl-2-iodo-butane; and the 3-methyl-2-halo-butanes, represented by 3-methyl-2-chloro-butane, 3-methyl-2-bromo-butane and 3-methyl-2-iodo-butane.

Representative of the alkyl halides containing 4 carbon atoms in the main chain which can be dehydrohalogenated and dehydrogenated simultaneously to form 2,3-dimethyl-1,3-butadiene are the 2,3-dimethyl-2-halo-butanes such as 2,3-dimethyl-2-chloro-butane; 2,3-dimethyl-2-bromo-butane and 2,3-dimethyl-2-iodo-butane.

The operating conditions required to simultaneously dehydrohalogenate and dehydrogenate these alkyl halides in accordance with the practice of this invention can vary somewhat. The temperatures required for the simultaneous dehydrohalogenation and dehydrogenation of these alkyl halides can vary from about 500° C. to about 800° C. The times that these alkyl halides are exposed to these temperatures can vary from about 0.01 second to about 2 seconds and is usually referred to as the residence time.

While it is possible to expose these alkyl halides to these operating conditions, particularly the temperature, without the use of some gaseous heat transfer agent, it has been found that best results can be obtained if a gaseous heat transfer agent is employed to cause the alkyl halides to reach the desired temperature as quickly as possible to cause the simultaneous dehydrohalogenation and dehydrogenation. If it is desired to employ a gaseous heat transfer agent, any inert gaseous heat transfer agent may be employed. Representative of such inert heat transfer agents which may be employed are steam, inert gases, such as nitrogen, neon, argon, helium, saturated hydrocarbons such as methane, ethane, propane and certain other olefins which, themselves, will not be degradated at the operating conditions. Representative of such olefins are ethylene, propylene, butene-2, isobutene, 2-methyl-butene-2, 2,3-dimethyl-butene-2. Other inert gaseous heat transfer agents may also be employed.

If a gas heat transfer is desired, the amount of gaseous heat transfer agent to the alkyl halide will depend on a number of factors. The inlet temperature of the alkyl halides is one factor; the inlet temperature of the gaseous heat transfer medium is another factor; the operating temperature desired is a factor; and the specific heats or heat transfer potential of the particular gaseous heat transfer medium and the alkyl halide employed is a factor. Thus, the ratio of the gaseous heat transfer agent to the alkyl halides depends largely upon the particular operating conditions desired, the inlet temperature of the reactants and the heat transfer agent and the specific heat or heat transfer potential of the materials employed. One skilled in the art can readily determine the proper ratio and the temperature required between the particular alkyl halide and the particular gaseous heat transfer agent which is to be employed in the process.

The simultaneous dehydrohalogenation and dehydrogenation of the alkyl halides of this invention to form diolefins in accordance with the invention can be accomplished at the operating conditions previously mentioned in the presence of a catalytic surface. These catalytic surfaces may be best described as a catalytic surface having an acid nature as well as a basic nature. These catalysts may also be described as a metal chemically bound to another element leading to acidic properties and basic properties. Such a catalytic surface can be either in the form of a fixed bed or fluidized bed. It has been found that suitable catalysts for the purposes of this invention can be a fixed bed metal oxide or a fluidized bed metal oxide.

Of the catalysts which can be employed, it is usually preferable to employ metal oxides wherein the metal is selected from Groups I$b$, II$a$, II$b$, III$a$, IV$a$, IV$b$, V$a$, V$b$, VI$b$, TII$b$, VIII and the lanthanum and actinium series of the Periodic Table of Elements. Representative of the metal oxides of Group I$b$ are the oxides of copper and gold. Representative of the metal oxides of Group II$a$ are the oxides of beryllium, magnesium, calcium, strontium and barium. Representative of the metal oxides of Group II$b$ are the oxides of zinc, cadmium and mercury. Representative of the metal oxides of Group III$a$ are oxides of boron, aluminum, gallium and indium. Representative of the metal oxides of the metal IV$a$ are oxides of silicon, tin and lead. Representative of the metal oxides of Group IV$b$ are the oxides of titanium and zirconium. Representative of metal oxides of Groups V$a$ are the oxides of antimony and bismuth. Representative of the metal oxides of Group V$b$ are oxides of vanadium. Representative of metal oxides of Group VI$b$ are the oxides of chromium, molybdenum and tungsten. Representative of the metal oxides of the metals of Group VII$b$ are oxides of manganese and rhenium. Representative of the metal oxides of Group VIII metals are the oxides of iron, cobalt and nickel. Representative of the metal oxides of the lanthanum series are the oxides of cerium and praseodymium. Representative of the metal oxides of the actinium series are the oxides of thorium.

The practice of this invention is further illustrated by reference to the following examples which are intended to be representative rather than restrictive of the scope of the invention.

EXAMPLE

In this example, a series of experiments were conducted in which 2-chloro-2-methyl butane was simultaneously dehydrohalogenated and dehydrogenated to form isoprene. Two reactors of 0.37 inch internal diameter and 8 inches in length were employed. In some cases, the reactor was made of silica or silicon oxide and in some cases was packed with 8–16 mesh fused silica or quartz chips. In other cases, the reactor was made of alumina or aluminum oxide and, in some cases, was packed with 8–16 mesh fused alumina chips. These reactors were inserted into a reactor block which was equipped with electrical heaters. Two preheaters were employed to bring the diluent and the reactant to the desired mixpoint temperature. These preheaters were also equipped with electrical heating systems. Both the reactant, 2-chloro-2-methyl butane, and the diluent, steam, were directed through the preheaters into the reactor which was brought to the desired operating temperature. When the temperature and flow were adjusted to the temperatures and times set forth in the table below, the effluent from the reactor was collected and analyzed by conventional vapor phase chromatographic techniques.

In these experiments, steam, at a mole ratio of diluent to 2-chloro-2-methyl butane of about 5/1, was employed as the diluent. Column 1 is the run number; column 2 is the temperature in degrees Centigrade; column 3 is the residence time in seconds; column 4 is the yield per pass of isoprene obtained in mole percent; column 5 is the conversion of the reactant in mole percent and column 6 is selectivity to isoprene in mole percent using conventional recycle techniques.

TABLE 1

Reactor-Silica; Reactant 2-chloro-2-methyl butane.
Runs 2 and 3 packed with silica chips.
Run 1 without silica chips.

| Run No. | Temp. | Time | Yield | Conversion | Selectivity |
|---|---|---|---|---|---|
| 1 | 650 | 0.3 | 7 | 17 | 41 |
| 2 | 650 | 0.3 | 12 | 24 | 49 |
| 3 | 675 | 0.3 | 23 | 49 | 47 |

TABLE 2

Reactor-Alumina; Reactant 2-chloro-2-methyl butane.
Runs 2, 3, 4 and 5 packed with alumina chips.
Run 1 without alumina chips.

| Run No. | Temp. | Time | Yield | Conversion | Selectivity |
|---|---|---|---|---|---|
| 1 | 650 | 0.3 | 10 | 23 | 43 |
| 2 | 650 | 0.3 | 18 | 35 | 51 |
| 3 | 650 | 0.5 | 21 | 38 | 55 |
| 4 | 650 | 0.8 | 26 | 49 | 53 |
| 5 | 675 | 0.3 | 27 | 50 | 54 |

To illustrate that the process of this invention, namely the simultaneous dehydrohalogenation and dehydrogenation of certain alkyl halides, and particularly 2-chloro-2-methyl butane, provides a better process than the straight dehydrogenation of the corresponding olefin 2-methyl-2-butene, several dehydrogenation experiments were conducted in the same reactors. It should be observed that much lower yields, conversions and selectivities were obtained even when higher temperatures were employed to dehydrogenate 2-methyl-2-butene than when 2-chloro-2-methyl butane was simultaneously dehydrohalogenated and dehydrogenated.

TABLE 3

Reactor-Silica; Reactant 2-methyl-2-butene
Both runs packed with silica chips.

| Run No. | Temp. | Time | Yield | Conversion | Selectivity |
|---|---|---|---|---|---|
| 1 | 675 | 0.3 | 4 | 12 | 33 |
| 2 | 700 | 0.3 | 10 | 27 | 37 |

Reactor-Alumina; Reactant 2-methyl-2-butene
Both runs packed with alumina chips.

| | | | | | |
|---|---|---|---|---|---|
| 3 | 675 | 0.3 | 4 | 11 | 36 |
| 4 | 700 | 0.3 | 11 | 28 | 40 |

Thus, these data indicate that the process of the invention gives results superior to those of the prior art.

While certain representative embodiments and details have been shown for the purpose of illustrating the invention, it will be apparent to those skilled in this art that various changes and modifications may be made therein without departing from the spirit or scope of the invention.

What is claimed is:

1. A process for the preparation of isoprene which consists of simultaneously dehydrohalogenating and dehydrogenating at least one alkyl halide selected from the group consisting of 2-methyl-2-halo-butanes and 3-methyl-2-halo-butanes at temperatures from 500° C. to about 800° C. for residence times from about 0.01 to about 2.0 seconds while in contact with a catalyst consisting of at least one oxide of an element selected from the group consisting of aluminum and silicon.

2. A process according to claim 1 wherein the alkyl halide is a 2-methyl-2-halo-butane.

3. A process according to claim 1 wherein the alkyl halide is a 3-methyl-2-halo-butane.

4. A process for the preparation of 2,3-dimethyl-1,3-butadiene which consists of simultaneously dehydrohalogenating and dehydrogenating at least one 2,3-dimethyl-2-halo-butane, at temperatures from 500° C. to about 800° C. for residence times from about 0.01 to about 2.0 seconds while in contact with a catalyst consisting of at least one oxide of an element selected from the group consisting of aluminum and silicon.

* * * * *